United States Patent
Esteve et al.

[15] 3,678,040
[45] July 18, 1972

[54] PROCESS FOR THE PREPARATION OF HYDROXYBENZENE SULFONATES OF MORPHOLINOMETHYL AMINOOXAZOLIDONES

[72] Inventors: Antonio Esteve; Jose M. Espinos, both of Barcelona, Spain

[73] Assignees: Laboratorios del Dr. Esteve, S.A., Barcelona; Laboratorios Espinos y Bofill S.A., Cornelia, Spain

[22] Filed: July 25, 1967

[21] Appl. No.: 655,772

[52] U.S. Cl. .................. 260/240 A, 260/240 R, 424/248
[51] Int. Cl. .................................................... C07d 87/46
[58] Field of Search ............................... 260/240, 240 A

[56] References Cited

UNITED STATES PATENTS 2,802,002  8/1957  Gever ........................... 260/240
3,182,058  5/1965  Conover ........................ 260/240

OTHER PUBLICATIONS

Heymann et al., Arch. Biochem. Biophys. 73, 366–373, 380–383 (1958).
Londrillo et al., Boll. Soc. Ital. Biol. Sper. 39 (24), 1682–1683 (1963).
Ishidate et al., J. Pharm. Soc. Japan 69, 513–518 (1949).

Primary Examiner—Henry R. Jiles
Assistant Examiner—G. Thomas Todd
Attorney—Hammond & Littell

[57] ABSTRACT

Anti-microbial and anti-haemmorhagic hydroxybenzene sulfonates of morpholinomethyl 3-amino-2-oxazolidones having the general formula:

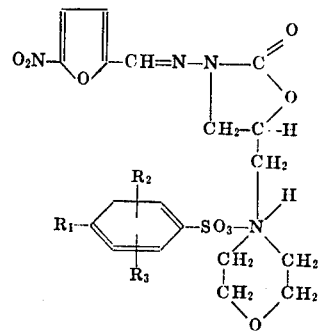

in which $R_1$, $R_2$ and $R_3$ represent members selected from the group consisting of hydrogen, hydroxyl and sulfonic acid are obtained by reacting a compound of the formula:

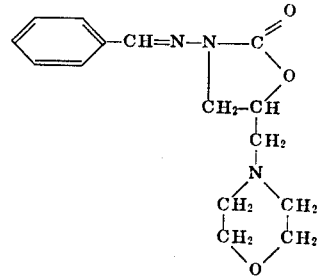

with a sulfonic acid of the formula:

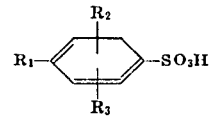

and reacting the product with 5-nitrofurfural.

6 Claims, No Drawings

3,678,040

PROCESS FOR THE PREPARATION OF HYDROXYBENZENE SULFONATES OF MORPHOLINOMETHYL AMINOOXAZOLIDONES

BACKGROUND OF THE INVENTION

1. Field of the Invention

The instant invention relates to anti-bacterial compounds with a 5-nitrofurfurylidene ring attached to an amino-substituted heterocyclic ring or similar grouping. 2. Description of the Prior Art Numerous anti-bacterial substances are know wherein a 5-nitrofurfurylidene ring is attached through an imino group to the heterocyclic ring.

It has been know for some time, see for instance Dodd and Stillman, *J. Pharmocol.* (1944), 82, 11, that derivatives of furan, nitrated in the 5-position can exhibit bacteriostatic and bactericidal activity in vitro.

U. S. Pat No. 2,416,234 (Stillman, Scott) relates to what may be thought of as the simplest of such compounds, in the form of 5-nitro-2furaldehyde semicarbazone (Nitrofurazone)

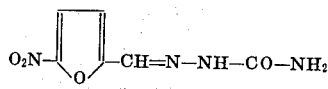

This compound is a topical antiseptic against Gram-positive and Gram-negative bacteria. Local sensitivity reactions are, however, frequent and prolonged topical therapy increases the risk of sensitization.

Another antibacterial compound (see Hayes, U.S. Pat No. 2,610,181 and Michels, U.S. Pat. No. 2,898,335) is Nitrofurantoin, i.e. 1-(5-nitro-2-furfurylideneamino)hydantoin

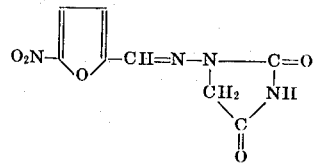

Yet another compound (see U.S. Pat. No. 2,742,462 and Drake and Hayes, U.S. Pat. No. 2,759,931) is 3-(5-nitro-2-furfurylideneamino)-2-oxazolidinone (Furazolidone)

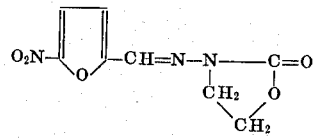

Still another compound with a 5-nitrofurfurylidene ring is Furaltadone (Altafur), (see U.S. Pat No. 2,802,002).

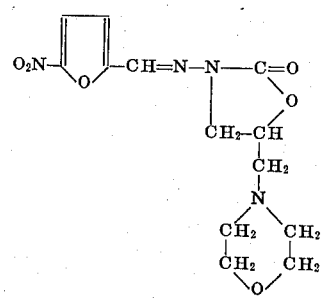

While such compounds exhibit bacteriostatic and bactericidal activity, their use is often attended by local sensitivity reactions, and, in some circumstances, their toxicity can present difficulties.

SUMMARY OF THE INVENTION

This invention relates to new morpholine derivatives of hydroxybenzene sulfonates, in particular morpholine derivatives corresponding to the general formula:

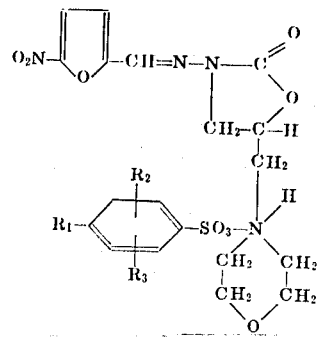

in which $R_1$, $R_2$ and $R_3$ represent hydrogen, hydroxyl radicals of sulfonic groups attached to certain carbon atoms of the benzene nucleus and to a new process for the preparation of such compounds.

Included among this group of products in inter alia the 2,5-dihydroxybenzene sulfonate of 5-morpholinomethyl-3-(5-nitrofurfurylidene-amino)-2-oxazolidone, a compound which exhibits remarkable therapeutic properties in regard to its activity on a large variety of pathogenic microorganisms and its low toxicity, which is even lower that that of the other nitrofuran derivatives already described.

In addition to its anti-microbial activity, the aforementioned compound is also effective as an anti-haemorrhagic which is important above all when it is used either preventively or curatively in veterinary medicine for treating chronic respiratory disease and other diseases affecting cattle with haemorrhagic complications.

To carry out the process according to the invention, the corresponding benzylidene derivative of 5-morpholinylmethyl-3-aminooxazolidone corresponding to the formula:

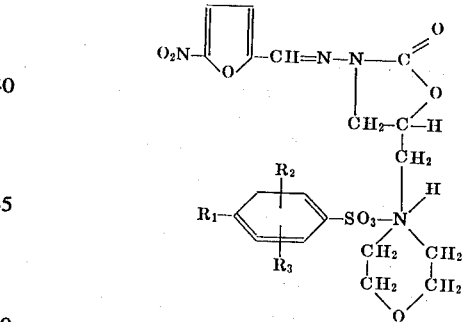

is prepared by the action of alkali on an aqueous suspension of the azole hydroxybenzylidene derivative of ethyl N-(3-morpholinyl-2-propanol)-N-carboxylate corresponding to the formula:

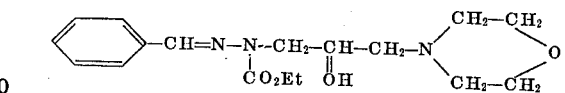

The benzylidene derivative thus obtained is reacted with a benzene sulfonic acid corresponding to the general formula

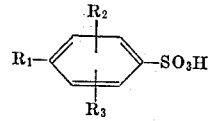

in which $R_1$, $R_2$ and $R_3$ are as defined above. Finally, a solution of 5-nitrofurfural is added to the reaction medium without separating the hydroxybenzene sulfonate of the 5-morpholinomethyl-3-benzylideneamino-2-oxazolidone formed, the reaction continuing in such a way that, after a certain period of time, the required product is separated out.

The preparation of the 2,5-dihydroxybenzene sulfonate of 5-morpholinomethyl-3-(5-nitrofurfurylidene-amino)-2-oxazolidone is described by way of example in the following in order to illustrate the process according to the invention. The formula of this compound corresponds to the general formula given above in which $R_2$ and $R_3$ are substituted by two hydroxyl groups in the 2- and 5-positions relative to the sulfonic group, while $R_1$ is hydrogen. The corresponding 2,5-dihydroxybenzene-1,4-disulfonic acid derivative corresponds to the general formula in which $R_2$ and $R_3$ are substituted by two hydroxy groups in 2- and 5-positions relative to a sulfonic group, while $R_1$ is a sulfonic acid group in the 4-position.

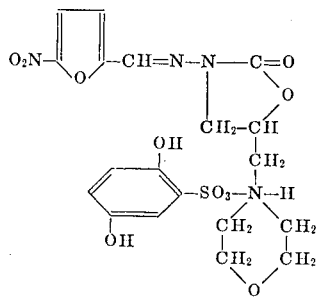

EXAMPLE

Preparation of the 2,5-dihydroxybenzene sulfonate of 5-morpholinomethyl-3-(5-nitrofurfurylidene-amino)-2-oxazolidone:

14.5 g. (0.05 mol.) of 5-morpholinomethyl-3-benzylidene-amino-2-oxazolidone are dissolved in 100 cc. of hot n-butanol. 11.5 g. (0.06 mol.) of 2,5-dihydroxybenzene sulfonic acid are then added with stirring to the resulting solution, and the resulting mixture is heated for 10 minutes to 80°C. A solution of 7 g. (0.05 mol.) of 5-nitrofurfural in 50 cc. of butanol is then added, and the solution thus obtained heated under reflux for 15 minutes. In this way, a yellow oil is formed which settles at the bottom of the reaction vessel. On cooling, the oil solidifies. The liquid is separated and the powdered solid washed three times with boiling methanol.
Yield = 14 g.

Physical and chemical properties:

The product thus obtained is a yellow powder which melts at 212°–214° C. It forms a 10 percent by weight solution in water at 20° C. It is far less soluble in ethyl alcohol and completely insoluble in most of the conventional organic solvents.

Toxicity:

The $LD_{50}$ as determined on rats to which the product was orally administered, is 500 mg/kg.

Anti-microbial activity:

Anti-microbial activity on various strains of Staphylococci, Salmonella and Colibacilli was examined by the diffusion method and by the method comprising introduction into the medium. The results are set out in the following tables:

TABLE I

Sensitivity of various microorganisms to the product obtained which was incorporated in the culture medium:

| Microorganism | Product obtained concentration in µ/ml. 8 4 2 1 0.5 | Controls |
|---|---|---|
| Staphylococcus | | |
| Strain 1 | O O O O O | N |
| 2 | O O O O N | N |
| 3 | O O O O N | N |
| 4 | O O O O N | N |
| 5 | O O O O N | N |
| 6 | O O O O N | N |
| Salmonella pollorum | | |
| Strain 1 | O O O O N | N |
| 2 | O O O O N | N |
| S. Gallinarum | O O O O O | N |
| Colibacillus | | |
| Strain 1 | O O N N N | N |
| 026 | O O O O N | N |
| 0111 | O O O N N | N |

O = absence of growth;
N = growth similar to that of control plate

TABLE II

Activity of the product obtained on various microorganisms by the gelose-diffusion test:

| Microorganism | Product obtained discs impregnated with a 100 µg/cm³ solution mean inhibition diameter |
|---|---|
| Staphylococci | |
| Strain 1 | 17.4 mm. |
| 5 | 15.9 mm. |
| 7 | 15.6 mm. |
| Salmonella pollorum | |
| Strain 1 | 13.90 mm. |
| 2 | 14.00 mm. |
| Colibacilli | |
| Strain 026 | 12.80 mm. |

Antihaemorrhagic activity:

The product has a marked haemostatic activity which is apparent when its effects on bleeding time are observed. These effects can be demonstrated by determining the average bleeding time of rabbits using a variation of the Roskan method [cf. J. Laporte, "Au sujet de l'Essai Pharmacologique des Hemostatiques] Chimiotherapie, 3; 62/80 (1961)] before and after administration of the product. On the other hand, the effect which the new compound has on the mean bleeding time of rabbits is proportional to the quantity of product administered. Thus, it was noticed that the administration of 3.5 mg/kg. of product to a group to six rabbits produces an average decrease in the mean bleeding time of 18 percent. When administered in a dose of 7 mg/kg., the product produces an average decrease in the mean bleeding time of 33 percent and one of 40% when administered in a dose of 14 mg/kg.

Applications:

The product obtained by the process according to the invention may be used in therapy for treating infections caused by gram-positive and gram-negative microorganisms. It is particularly effective in the treatment of infections caused by staphylococci.

It may also be used in veterinary medicine for treating bacterial infections and is particularly suitable for use in the preventive or curative treatment of chronic respiratory disease affecting poultry and of cattle diseases accompanied by haemorrhagic complications.

The doses will be governed by the form of administration, the weight of the animal and the seriousness of the infection.

The product may be administered if desired in the form of a composition comprising the product and a pharmaceutically-acceptable carrier, by mixing it with the feed or by dissolving it in drinking water or finally by parenteral injection.

It will be appreciated that the embodiment described has been given above all by way of example and that it may be modified in numerous ways without departing from the scope of the invention.

We claim:
1. A method for preparing a compound of the formula

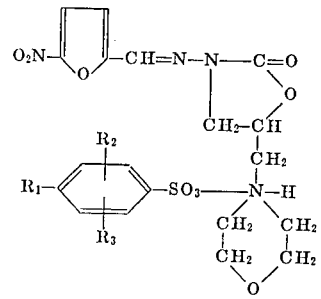

in which $R_1$ is selected from the group consisting of hydrogen and sulfonic acid and $R_2$ and $R_3$ each represent a hydroxyl which consists essentially in reacting a compound of the formula

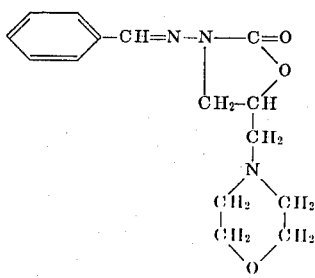

in a non-aqueous medium with a sulfonic acid of the formula

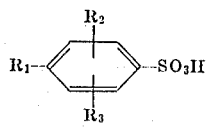

in which $R_1$, $R_2$ and $R_3$ are as defined above, treating the resultant product without separation with 5-nitrofurfural at reflux to give a final product, and isolating the final product.

2. A method according to claim 1 wherein said sulfonic acid is 2,5-dihydroxybenzene sulfonic acid.

3. A method according to claim 1 wherein the sulphonic acid is 2,5-dihydroxybenzene-1,4-disulfonic acid.

4. A method according to claim 1 wherein said reaction in non-aqueous medium is carried out at a temperature of from 70° to 120° C.

5. A method according to claim 2 wherein 5-morpholinomethyl-3-benzylidene amino-2-oxazolidone is reacted with 2,5-dihydroxybenzene sulfonic acid at a temperature of from 70° to 120° C.

6. A method according to claim 2 wherein said non-aqueous medium is n-butanol.

* * * * *